United States Patent [19]

Watanabe et al.

[11] Patent Number: 4,750,265
[45] Date of Patent: Jun. 14, 1988

[54] METHOD FOR INSTALLING A WIRE HARNESS

[75] Inventors: Mitsugu Watanabe; Kazuhiko Kaneko; Etsuji Matsumoto, all of Kosai, Japan

[73] Assignee: Yazaki Corporation, Japan

[21] Appl. No.: 884,174

[22] Filed: Jul. 9, 1986

[30] Foreign Application Priority Data

Feb. 18, 1986 [JP] Japan .................................. 61-031910

[51] Int. Cl.⁴ ............................................. H01R 43/00
[52] U.S. Cl. ......................................... 29/854; 29/857
[58] Field of Search ................. 29/854, 855, 856, 857, 29/858, 859, 868, 869, 462, 428; 361/331, 346, 350, 417–420, 428

[56] References Cited

U.S. PATENT DOCUMENTS 4,493,146 1/1985 Cronin ................................. 29/857
4,508,404 4/1985 Frawley ............................. 29/854 X

FOREIGN PATENT DOCUMENTS 0091618 4/1982 European Pat. Off. .
0108522 5/1984 European Pat. Off. .
3435566 4/1986 Fed. Rep. of Germany .
2136255 9/1984 United Kingdom .

Primary Examiner—Timothy V. Eley
Attorney, Agent, or Firm—Lowe, Price, LeBlanc, Becker & Shur

[57] ABSTRACT

A method of and apparatus for installing a wire harness of an automobile which facilitates installation of a wire harness onto a car body. First of all the wire harness and electrical equipment are fixed on a carrier panel. In the fixing them, the connectors of the wire harness are positioned for connection to the articles of electrical equipment. Some connectors of the wire harness fixed on the carrier panel are adapted to be connected to the connectors of the wire harness of the car body. The thus prepared assembly of carrier panel, the wire harness, the electrical equipment is bodily attached to the car body.

6 Claims, 5 Drawing Sheets

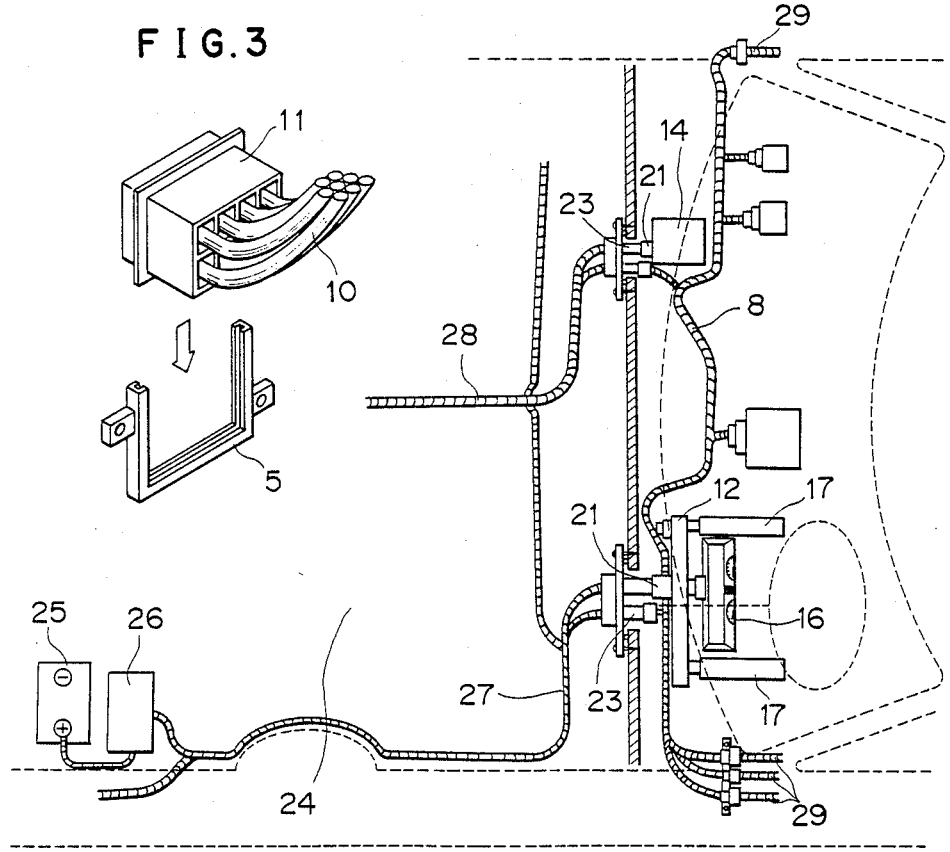

METHOD FOR INSTALLING A WIRE HARNESS

BACKGROUND OF THE INVENTION

This invention relates to improvements in a process and apparatus for installing a wire harness used for an automobile electric circuit into a vehicle body.

Wire harnesses used for automobile electric circuits commonly have such a structure that a large number of branch lines extend from a main line composed of a large number of electric wires bound together or bundled by a wrapping tape. Such a wire harness is installed onto a car body such that the main line thereof is wired in a spacing within an automobile and secured at several portions thereof by fastening means and the branch lines are then connected by means of connectors provided at ends of the branch lines to electrical equipment including several loads such as a motor and a solenoid, switches, and electric connection boxes such as a junction box and a fuse box.

An example of wire harness installation will be described below with reference to the drawings. Referring to FIG. 5, an instrument panel 31 molded from a synthetic resin material and a reinforcement member 32 made of a metal material are shown. The reinforcement member 32 is secured to a car body either by means of bolts or by welding, and the panel 31 is mounted on the reinforcement member 32. A wire harness 33 has a main line portion 34 and a plurality of branch lines 35 extending from the main portion 34. The branch portions 35 may be varied in length and extend irregularly in various directions from the main portion 34. Several fastening members 36 such as clips are provided on the main portion 34. The wire harness 33 is secured to the panel 31 or the reinforcement member 32 by means of the fastening members 36 or wire bands. The main portion 34 extends at an end thereof through a through-hole 38 in a car body fire wall 37 to an engine room 39 as shown in FIG. 6. A grommet 40 is fitted in the through-hole 38 of the fire wall 37 for protecting and securing the wire harness 33. Connection of the wire harness 33 to articles of electrical equipment 41 (only one is shown in FIGS. 5 and 6) may be established by means of connectors 42 provided at ends of the main portion 34 and/or the branch portions 35.

In such a wire harness of a bundle form as described above and a process of installing the same, coupling of connectors to various articles of electrical equipment is all accomplished by manual operation because the connectors are provided at ends of branch portions which extend like freely movable branches from the main portion of the wire harness, and hence hands of operators to accomplish such manual operation and spacings in which a hand can operate are required. Besides, where connectors are concentrated such as connectors 42' (FIG. 5) to be coupled to various instruments at the instrument panel, a handle column or several switches, the wire harness is larger in diameter, which makes arrangement of the wire harness and practical use of spacings further difficult. Further, in order to thread the wire harness through a through-hole of the car body, protection and fixation thereof by means of a grommet is required, and hence a hand of an operator is essentially required for installation of the wire harness. In addition, connection of the wire harness 33 with another wire harness can be done only after assembly of the panel and the reinforcement member to the car body and also requires a hand of an operator.

Thus, according to the prior art, connecting operations of a wire harness to various articles of electrical equipment depend mostly upon manual operations and it is difficult to reduce the number of man-hours for installation of the wire harness and automate such installation using a machine, which makes a serious obstruction to speed-up in automobile production lines. Besides, since manual operations are primarily involved, spacings for manual installation operations are required, which makes it difficult to entirely compact the system.

SUMMARY OF THE INVENTION

It is an object of the present invention to provide a process of and apparatus for installing a wire harness or like articles in electrical equipment of an automobile by minimizing manual installation procedures possible and facilitate automation using a machine such as a robot.

It is another object of the invention to provide a process of and apparatus for installing a wire harness or like articles of electrical equipment of an automobile or the like which can allow speed-up of production lines by automation and reduction of the number of man-hours.

It is a further object of the invention to provide an apparatus for installing a wire harness which can be made compact to allow effective utilization of a spacing within an automobile.

In order to eliminate the drawbacks of the prior art described above, according to one aspect of the present invention, there is provided a method of installing a wire harness by securing the same within an automobile and connecting said wire harness to articles of electrical equipment of the automobile by way of connectors attached at the wire harness, said connectors including a first connector and a second connector, said method comprising the steps of providing a carrier panel adapted to be attached to a car body having wire harness means installed therein, fixing the wire harness and the articles of electrical equipment on said carrier panel, said first connector being adapted for connection to said wire harness means of the car body, and positioning said second connector for connection with a first selected member of the articles of electrical equipment.

In the process of the invention, a carrier panel for accommodating or holding a wire harness and various articles of electrical equipment to be connected to the wire harness is provided in advance.

The wire harness is wired and secured along fixing members on the carrier panel and is thus accommodated in and protected by the panel. Accordingly, there is no need of wrapping the main portion and the branch portions over the entire length of the wire harness using a tape as in the prior art, and the wire harness need only be bundled at several positions spaced by a suitable distance to such a degree that electric wires of the wire harness may not get loose, which may lead to reduction in production steps and cost of the wire harness itself.

Subsequent to wiring and securing of the wire harness, selected members of connectors connected to ends of the main portion and of the branch portions are secured by positioning means to face selected members of the articles of electrical equipment. Securing of each connector may be achieved by fitting or riveting the connector to a fitting member which is provided in advance at a position corresponding to another connector provided for each article of electrical equipment.

Finally, some articles of electrical equipment corresponding to the positioning means are fitted and secured in position whereupon the connectors of the wire harness are connected to the connectors for the articles of electrical equipment, thereby completing installation of the wire harness, connectors and various articles of electrical equipment on the carrier panel.

Installation of the wire harness and the attached connectors of the wire harness on the carrier panel is done by manual operation, but this can be accomplished easily because they are already positioned there. Besides, connection of the attached connectors of the wire harness to the electric components can be done easily because only fitting and securing of the articles of electrical equipment along the respective positioning means will automatically couple the attached connectors of the wire harness to the connectors of the electrical equipment. Accordingly, the necessity of such an operation for connecting an attached connector of a wire harness to an electric component as needed in the prior art can be eliminated, and installation of electrical equipment can be automated using a machine such as a robot.

According to another aspect of the present invention, there is provided an apparatus for installing a wire harness by securing the same within an automobile and connecting said wire harness to articles of electrical equipment of the automobile by way of a plurality of connectors attached at ends of a main portion and branch portions of the wire harness, said apparatus comprising a carrier panel adapted to be attached to a car body having wire harness means installed therein; wire harness fixed to said carrier panel and having a main portion and branch portions at respective ends of which a plurality of connectors are attached, said connectors including a first connector and a second connector, said first connector being for connection to said wire harness means of the car body; articles of electrical equipment installed on said carrier panel; and means for positioning said second connector to face a first selected member of said articles of electrical equipment.

For the carrier panel in the present invention, not only a member having a solid structure such as an instrument panel or a reinforcement member as described above but also a member in the form of a plate such as a car body fire wall as described above or a door panel which has a configuration to allow securing by a suitable means such as welding or fastening with a bolt are used depending upon desired spacings of the automobile.

The carrier panel has provided in advance on a wall thereof a fixing means along a wiring pattern of the wire harness and where necessary installing means having a configuration corresponding to an article of electrical equipment. The fixing means may be a groove or grooves formed continuously or intermittently in an inner wall of the panel for receiving and securing the wire harness therein or a plurality of clamps projectingly provided in a spaced relationship by a suitable distance from each other for holding the wire harness therein or else a combination of such groove or grooves and clamps. The grooves or clamps may be provided corresponding to the main portion and the branch portions of the wire harness and may be formed widely or narrowly so as to accommodate or hold thick or thin portions of the wire harness therein. Normally, the installing means for electrical equipment are each provided either in the form of a frame element or a fitting window having a locking means for electrical equipment. Since the electrical equipment may be any of various devices such as load devices including a lamp, a motor, a solenoid, a relay or a radio, controlling devices such as a switch, a sensor and a control unit for controlling such load devices, indicating devices such as an instrument and electric connection boxes such as a fuse box and a relay box, the positioning guides are formed in conformity with configurations of the devices.

Further, means for positioning an attached connector of the wire harness is provided at a position in each of the installing means which is opposed to a connector provided for electrical equipment when an article of electrical equipment is fitted and secured in the installing means. The positioning means may be either a fitting rail which is formed in integral relationship on the carrier panel for fitting the attached connector vertically or horizontally thereon or any other known means such as a fastening screw.

According to the apparatus of the invention, the harness is put in from the front or a side of the carrier panel and is wired and secured along the fixing members whereafter the connectors proviced at ends of the main and branch portions of the wire harness can be put in utilizing spacings of the installing means formed to open for the electrical equipment. Accordingly, operations therefor are easy. Further, since coupling of the attached connector to a connector of electrical equipment is established automatically by fitting of the electrical equipment in position as described above, there is no need of forming an additional operation space for connection of connectors as in the prior art.

In this manner, since a wire harness, connectors attached to the wire harness and electrical equipment are installed in a compact configuration using the carrier panel, a limited small space within an automobile can be utilized effectively. In addition, according to the apparatus of the invention, since various articles of electrical equipment necessitated by an automobile can be installed or formed integrally on the carrier panel, operations for mounting the electrical equipment and for installing the wire harness which have been conventionally conducted in production lines of an automobile maker can be transferred to a wire harness maker, which will allow speed-up of production lines.

BRIEF DESCRIPTION OF THE DRAWINGS

FIG. 3 is a perspective view showing means for positioning an attached connector of a wire harness of the apparatus of FIG. 1;

FIG. 4 is a wiring diagram of the wire harness where an apparatus according to the present invention is applied to a portion of an automobile near an instrument panel;

DESCRIPTION OF THE PREFERRED EMBODIMENT

Now, the present invention will be described in detail with reference to the accompanying drawings.

Figure 1:
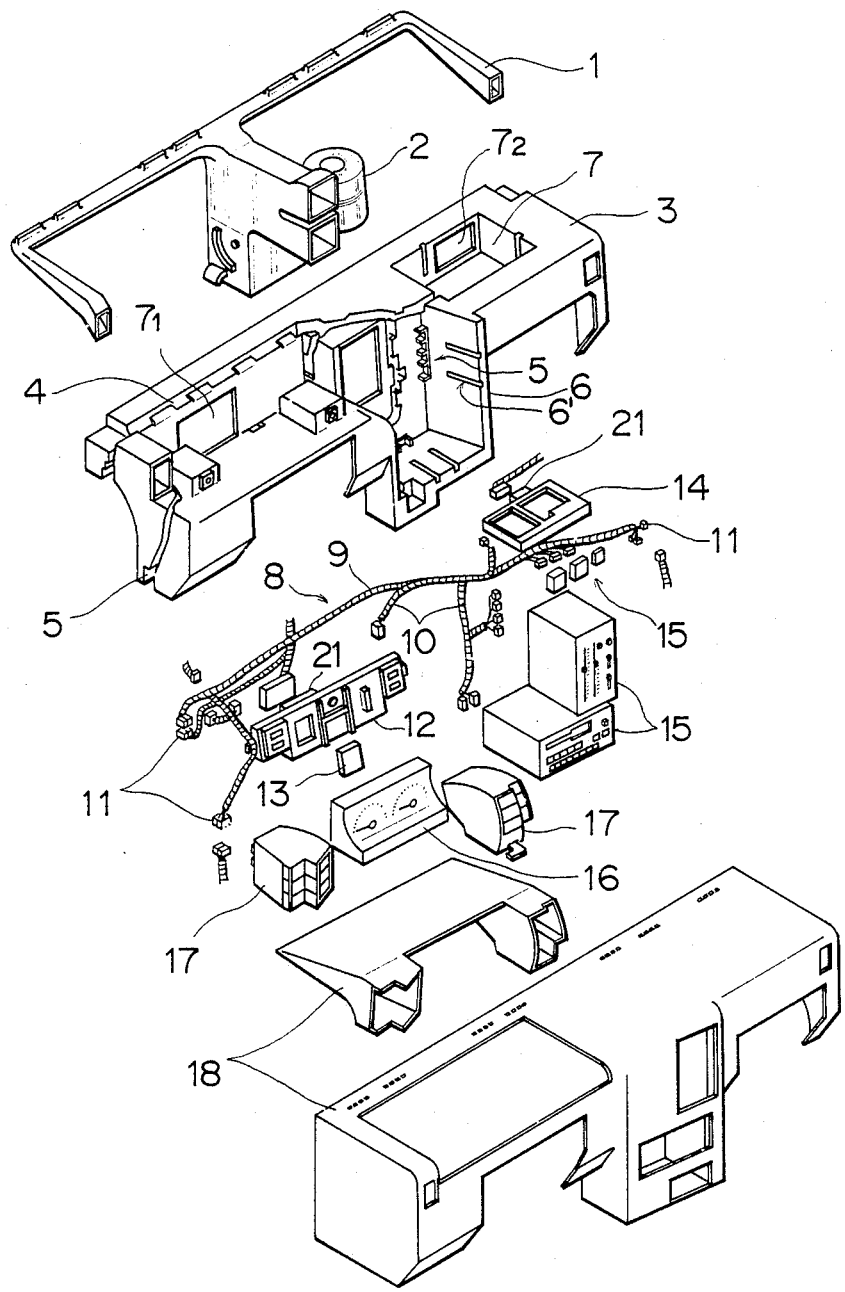
FIG. 1 is an exploded perspective view illustrating a preferred embodiment of apparatus according to the present invention.

Referring first to FIG. 1, a blower motor 2 is located on a duct (blast pipe) 1. A carrier panel 3 is produced either by molding a plastics material or by stamping a metal plate or else by resin treatment on a metal plate. The carrier panel 3 has formed on an inner wall thereof a groove 4 for fixing therein a wire harness 8 having a main portion 9 and a plurality of branch portions 10. A fixing bracket 5 to securely receive therein a connector 11 provided at an end of each branch portion 10 as shown in FIG. 3 is secured at an end of the groove 4 by means of fastening screws. The carrier panel 3 further has therein installing means for securing various articles of electrical equipment as hereinafter described. The installing means may be each formed either as a frame element such as indicated at 6 or as a fitting hole or window such as indicated at 7. Another fixing bracket 5 may be provided to face said frame element 6. Guide grooves 6' are provided in the inner walls of said frame elements 6 to recieve engagement means of said electrical equipment.

The electrical equipment secured to the carrier panel 3 may include a junction block 12, an option unit 13 which may be mounted on the junction block 12 depending upon a grade of the automobile, a microcomputer unit (CPU) 14 for controlling an engine, various electronic units 15 such as an air conditioner and a car stereo set, metering instruments 16, cluster switches 17, etc. Of these articles, of electrical equipment, the electronic units 15 are installed on the carrier panel 3 to be connected to the wire harness 8 through the respective connectors 11. On the other hand, the instruments 16 and the cluster switches 17 are directly connected to the junction block 12.

A panel cover 18 is mounted for covering the members 1 to 17 described above.

According to the apparatus of the present embodiment, connection of the wire harness 8 to the various articles of the electrical equipment 12 to 17 can be established very simply by forcing the wire harness 8 into the groove 4 from forwardly in the carrier panel 3 to secure the same thereto, fitting the attached connectors 11 of the wire harness 8 into the individual fixing brackets 5 from forwardly or through openings of the carrier panel 3, and then fitting various articles of electrical equipment indicated by reference numerals 12 to 17 onto or into the individually designated frame elements 6 or fitting holes (windows) 7.

Figure 2:
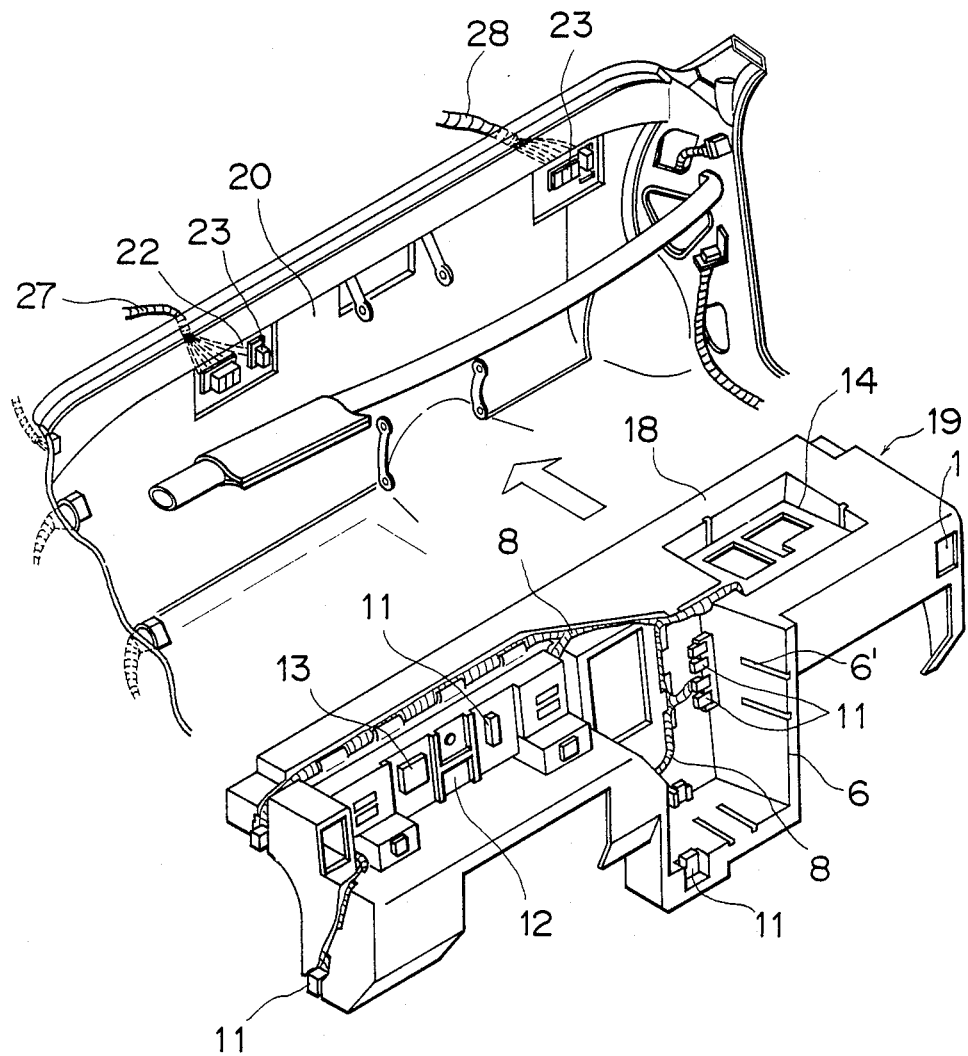
FIG. 2 is a perspective view showing the apparatus of FIG. 1 in a somewhat assembled form.
Figure 5:
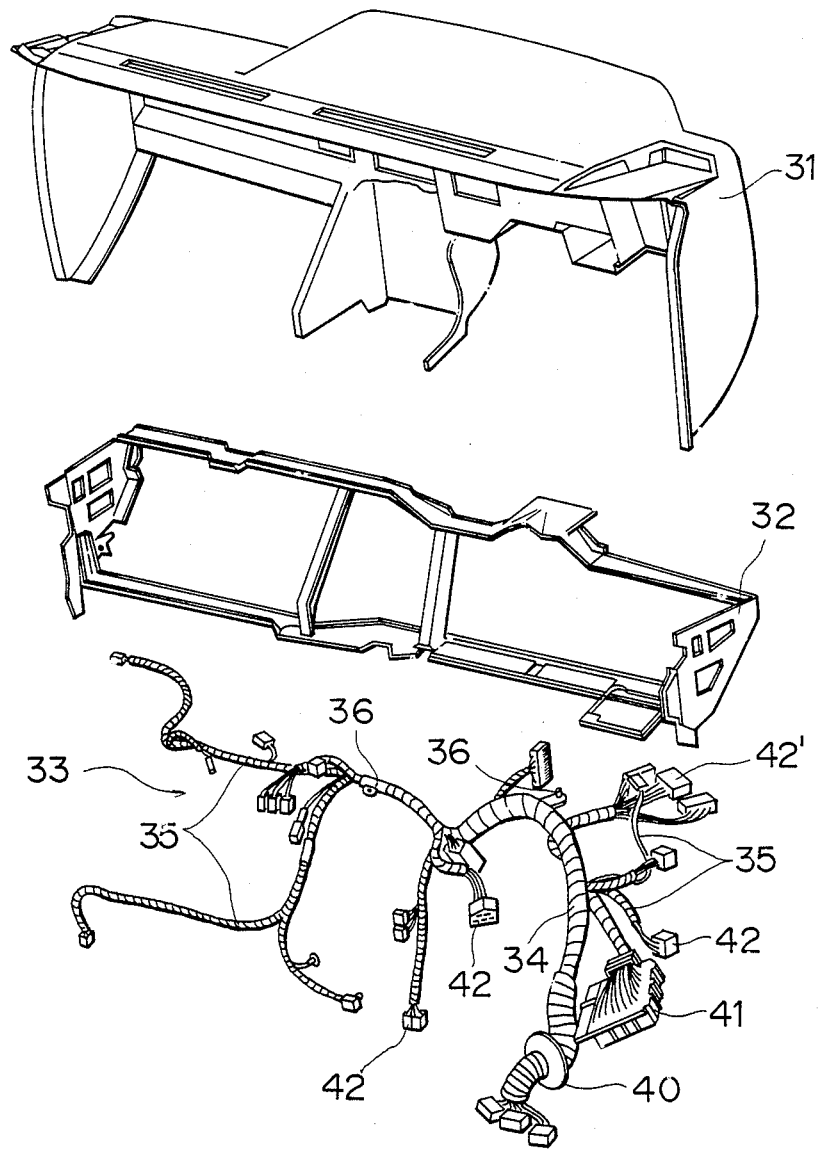
FIG. 5 is a perspective view showing a prior art apparatus.

Afterwards, an assembly 19 having the panel cover 18 securely mounted thereon is assembled to a car body 20 as shown in FIG. 2. The assembly 19, that is, the carrier panel 3, has a pair of fitting windows $7_1$ and $7_2$ opened in an interior wall thereof as shown in FIG. 1, and the junction box 12 and the CPU 14 are secured in the fitting windows $7_1$ and $7_2$, respectively.

The junction box 12 and the CPU 14 have connectors 21 provided thereon and extending through and from the fitting windows $7_1$ and $7_2$, respectively, while counterpart connectors 23 are provided in through-holes 22 of the car body 20. Accordingly, the wire harness 8 can be connected by way of a connector coupling to a main wire harness 27 led from a battery 25 and a fuse box 26 in an engine room 24 as shown in FIG. 4 while the CPU 14 can be connected by way of a connector coupling to an engine controlling wire harness 28 extending to the engine room 24. Furthermore, the wire harness 8 on the carrier panel 3 can be connected directly to a main wire harness 29 installed in the car body for supplying power to the rear portion electrical equipment or doors.

Figure 6:
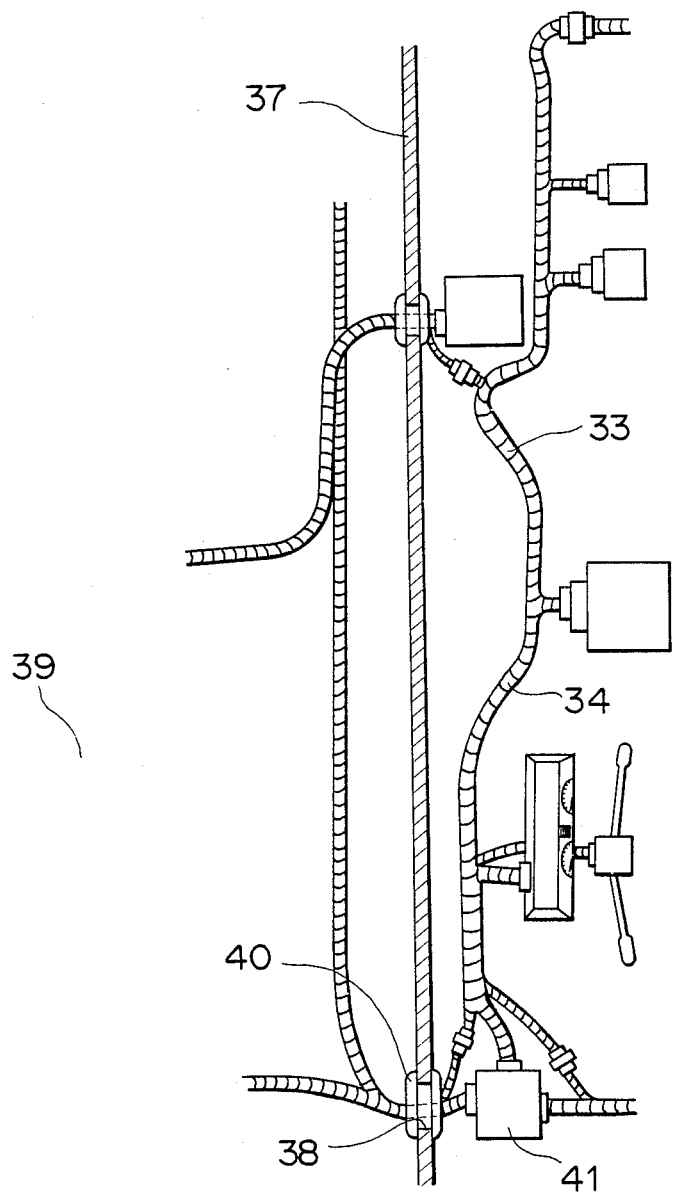
FIG. 6 is a wiring diagram of a wire harness near an instrument panel of an automobile according to the prior art.

Consequently, complicated operations such as threading of a wire harness of a large diameter through a through-hole in a car body and fitting of a grommet as in the case of FIG. 6 which shows an example of prior art arrangement can be eliminated. Besides, since there is no operation for threading a wire harness, wiring of a wire harness in a car can be accomplished independently for an engine room, an instrument panel and a seat, resulting in improvements in operability.

In this manner, by provision in a carrier panel of at least one electric connection box such as the junction box 12 which has a coupling means including a connector for connection with another wire harness, steps of installing a wire harness can be reduced and automation thereof can be facilitated.

What is claimed is:

1. A method of installing a wire harness by securing the same within an automobile and connecting said wire harness to articles of electrical equipment of the automobile by way of connector attached at the wire harness, said connectors including a first connector and a second connector, said method comprising the steps of:
    (a) providing a carrier panel adapted to be attached to a car body having wire harness means installed in the car body;
    (b) fixing the wire harness and the articles of electrical equipment on said carrier panel prior to attachment to said car body,
    (c) positioning said second connector on the carrier panel and connecting it with a first selected member of the articles of electrical equipment; and
    (d) positioning said first connector for connection to said wire harness means of the car body.

2. A method according to claim 1, wherein said carrier panel has a passenger room side and a car body side, said fixing step being performed on the passenger room side of the carrier panel, said fixing step being accompanied by a step of orienting a second selected member of the articles of electrical equipment and the carrier panel for connection to the wire harness means of the car body.

3. A method according to claim 1, further including a step of attaching said carrier panel to the car body subsequent to step (c).

4. The method of claim 1, wherein said wire harness is fixed within a groove formed in the carrier panel and said second connector is located within a fixing bracket formed on the carrier panel.

5. The method of claim 4, wherein said wire harness includes a main portion and branch portions and separate grooves are provided on the carrier panel in communication with a main groove, said main portion of the wire harness being inserted into the main groove and said branch portions being inserted into the branch grooves.

6. The method of claim 1, wherein said carrier panel includes frame elements and fitting windows and said articles of electrical equipment are selectively disposed in said frame elements and fitting windows for attachment to said carrier panel.

* * * * *